United States Patent [19]

Smith

[11] Patent Number: 4,763,764
[45] Date of Patent: Aug. 16, 1988

[54] WRAPPED SPRING, OVERRUNNING CLUTCH ASSEMBLY

[75] Inventor: Richard H. Smith, Birmingham, Mich.

[73] Assignee: General Motors Corporation, Detroit, Mich.

[21] Appl. No.: 61,422

[22] Filed: Jun. 12, 1987

[51] Int. Cl.⁴ .................. F16D 13/08; F16D 41/20
[52] U.S. Cl. ........................... 192/41 S; 192/72; 192/104 R; 192/104 C
[58] Field of Search ............ 192/41 S, 72, 104 C, 192/104 R, 56 C; 464/40

[56] References Cited

U.S. PATENT DOCUMENTS

| | | | |
|---|---|---|---|
| 2,105,330 | 1/1938 | Pagenkopf | 192/41 S X |
| 2,895,578 | 7/1959 | Winchell | 192/41 S |
| 4,090,785 | 5/1978 | Weninger | 464/40 X |
| 4,527,683 | 7/1985 | Mathews | 192/41 S X |

*Primary Examiner*—Rodney H. Bonck
*Attorney, Agent, or Firm*—Donald F. Scherer

[57] ABSTRACT

A clutch assembly to interconnect rotatable drive and driven members. A cylindrical clutch element is operatively connected to one of the rotating members, and a sleeve-like clutch element is attached to at least one other of the rotatable members. The sleeve-like clutch element is disposed in spaced, concentric relation about the cylindrical clutch element. A first helical spring having opposed ends is disposed concentrically about, and frictionally engages, the exterior surface of the cylindrical clutch element. A second helical spring having opposed ends is disposed concentrically within, and frictionally engages, the interior surface of the sleeve-like clutch element. The opposed ends of each helical spring serves as an energizing or a trailing end, depending upon the drive or driven function of the clutch element engaged thereby. As such, the trailing end of the spring frictionally engaging that clutch element secured to the drive member is secured to the energizing end of the spring engaging that clutch element secured to the driven member. The hands of the first and second spring are individually selected to enhance the frictional engagement of the spring in response to rotation of the clutch elements in one direction, and conversely to decrease the frictional engagement in response to rotation in the other direction. At least one of the spring may be selected to effect overrunning of the rotating clutch elements in response to a rotational velocity in excess of a desired range of rotational velocities.

1 Claim, 2 Drawing Sheets

WRAPPED SPRING, OVERRUNNING CLUTCH ASSEMBLY

TECHNICAL FIELD

The present invention relates generally to clutch assemblies for transferring power between a rotating drive and rotating driven members. More particularly, the present invention relates to clutch assemblies that employ helical springs to effect a driving connection between rotating drive and driven members. Specifically, the present invention relates to a clutch assembly whereby two, operatively connected, helical springs effect a driving connection between a cylindrical clutch element and a concentric, sleeve-like clutch element—the hand and gripping strength of the two helical springs being selected to allow a driving connection within a given range of rotational velocities and tend to allow an overrunning action when the torque direction is reversed or when the rotational velocity exceeds the desired range of rotational velocities.

BACKGROUND OF THE INVENTION

Helical springs have been widely employed to transmit torque between drive and driven members. Such arrangements have been typically employed both as clutches and as brakes.

In the simplest of these prior known arrangements a single, helical spring has been used selectively to transmit torque between two aligned shafts. A representative configuration for this type arrangement is disclosed in U.S. Pat. No. 4,235,133.

Arrangements of the type depicted in U.S. Pat. No. 4,235,133 effect an operative connection between the shafts only when the drive shaft is rotated in one direction. When the drive shaft is rotated in the appropriate direction to transmit torque, the helical spring frictionally grips both the drive and the driven shafts and rotates the driven shaft in response to rotation of the drive shaft. When the drive shaft is rotated in the opposite direction, the helical spring tends to release its frictional engagement of the two, aligned shafts, thus allowing the drive shaft to rotate with respect to the driven shaft. This configuration has been successfully employed for many years, but there are certain definite drawbacks to such an arrangement.

One of the primary drawbacks occurs because the drive and the driven shafts are axially aligned with the clutch spring spanning across the aligned ends of the two shafts. Such an arrangement is highly subject to binding, particularly in the situation where the gap between the aligned shafts is sufficient to allow one coil, or wrap, of the spring to lodge between the opposed ends of the shafts.

One way by which to ameliorate the reliability of this arrangement, and to assure a precise response not only for a driving connection but also for slippage (overrunning), is to provide a tang on each end of the spring so that engagement by the rotating members with one or the other of the tangs will effect a virtually instantaneous response. A representative configuration for a spring clutch which employs tangs is disclosed in U.S. Pat. No. 3,111,822.

Unfortunately, the sharp bend required between the body of the helical spring and the tang subjects such arrangements to serious stress concentrations. Such an arrangement is, therefore, quite conducive to untimely spring failures.

At least one configuration known to the art, which is best exemplified by U.S. Pat. No. 3,242,696, employs stepped, helical springs to effect a driving connection between concentrically disposed drive and driven elements. This is, perhaps, the closest prior art arrangement with which the inventor is aware.

SUMMARY OF THE INVENTION

It is an object of the present invention to provide a clutch assembly, as above, which employs two interconnected, helical springs, the hand according to which each of said helical springs is wrapped being determined by virtue of the relative disposition of one spring relative to the other within the clutch assembly as well as by virtue of the desired rotational direction for which an operative connection is to be provided by the clutch assembly.

It is a further object of the present invention to provide a clutch assembly, as above, wherein the springs do not require the use of end tangs for effective operation.

It is a still further object of the present invention to provide a clutch assembly, as above, which effects an overrun at rotational velocities beyond the desired range of acceptable rotational velocities.

It is yet another object of the present invention to provide a clutch assembly, as above, which positions the helical springs radially between the rotating clutch elements such that the springs may act as a centering bearing between the two rotating elements of the clutch assembly. Note that the free ends must not be used for centering.

It is an even further object of the present invention to provide a clutch assembly, as above, in which the coils of the helical springs can not effect a deleterious result by dropping into any gap between the axially aligned drive and driven shafts.

These and other objects of the invention, as well as the advantages thereof over existing and prior art forms, which will be apparent in view of the following detailed specification, are accomplished by means hereinafter described and claimed.

In general, a clutch assembly embodying the concepts of the present invention is employed to provide a driving connection between a rotating drive member and one or more rotating driven members. The clutch assembly employs a cylindrical clutch element operatively connected to one or more of the rotating members, and a sleeve-like clutch element operatively connected to one or more of the other rotating members. The sleeve-like clutch element is disposed in concentric, spaced relation, radially outwardly of the cylindrical clutch element.

First and second helical springs are employed to effect a rotational, driving connection between the clutch elements. Each of the helical springs has an energizing end and a trailing end. The first spring is concentrically disposed about, and frictionally engages, the cylindrical clutch element, at least when the clutch assembly is at rest. The second spring is concentrically disposed within, and frictionally engages, the sleeve-like clutch element.

The hand of each helical spring is selected to enhance, at least in response to rotation in one direction, the frictional engagement of that spring with the clutch element frictionally engaged thereby and to decrease the frictional engagement therebetween in response to rotation in the opposite direction. To effect the cooperative interaction desired between the helical springs incorporated in the clutch assembly, the trailing end of the helical spring frictionally engaging the clutch element which is connected to the drive member is connected to the energizing end of the helical spring frictionally engaging the clutch element which is connected to the driven member. In addition, the hand of each spring is selected appropriately not only to the direction in which the clutch element engaged thereby is to rotate but also to the disposition of the springs relative to each other within the clutch assembly.

The physical characteristics of at least one helical spring may be selected to effect an overrunning of the rotating clutch element engaged thereby in response to angular velocities in excess of a preselected value therefor.

Two alternative embodiments of a clutch assembly embodying the concepts of the present invention are shown by way of example in the accompanying drawings and are described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
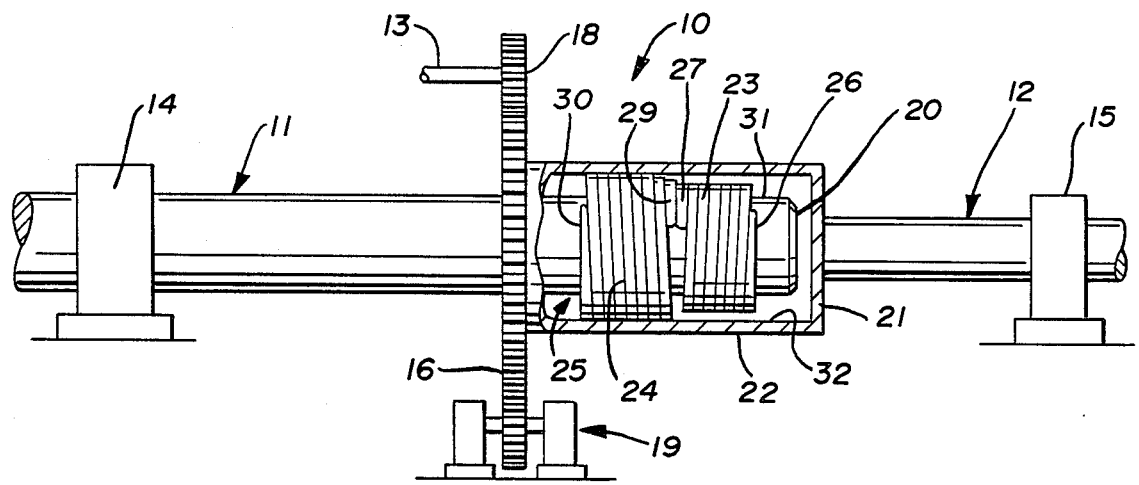
FIG. 1 is a schematic, side elevational view, partly broken away, of a clutch assembly embodying the concepts of the present invention, the clutch assembly depicted as effecting an operative, driving connection between three rotatable shafts.
Figure 2:
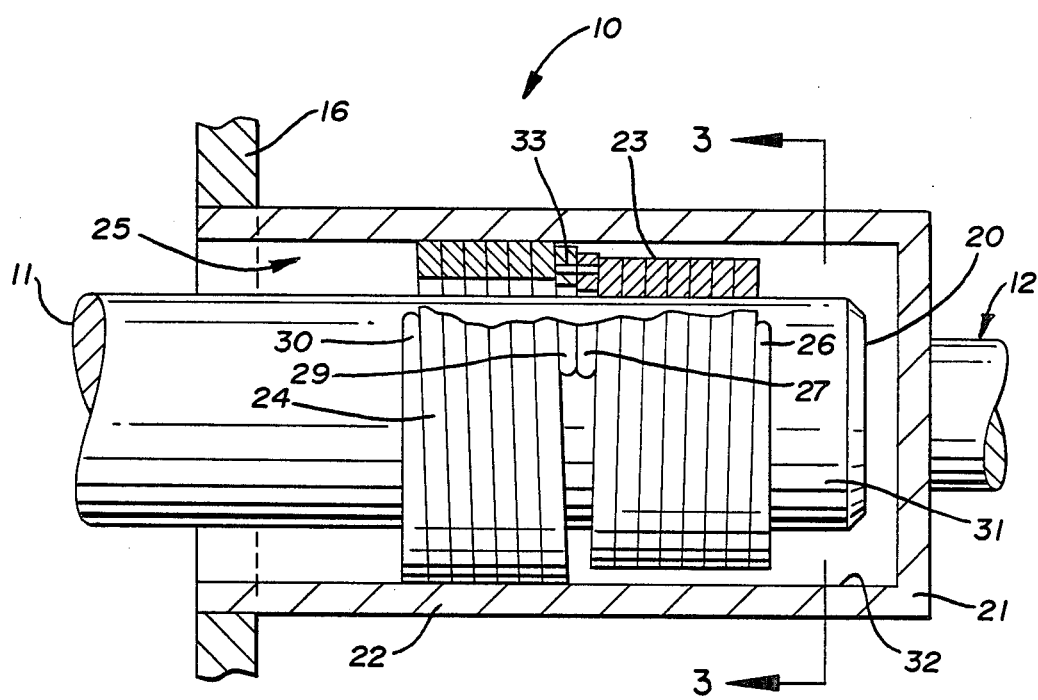
FIG. 2 is an enlarged area of FIG. 1 depicting one arrangement of the helical spring means operatively engaging the rotatable clutch elements, and with the spring means being partly broken away.
Figure 3:
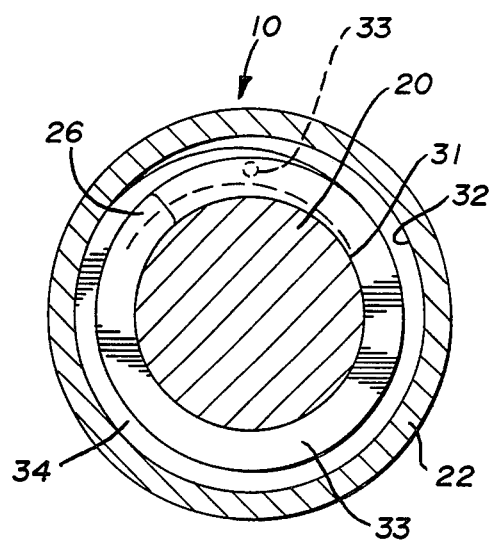
FIG. 3 is a transverse section taken substantially along line 3—3 of FIG. 2.

With reference to FIGS. 1-3 of the attached drawings, one exemplary embodiment of a clutch assembly incorporating the concepts of the present invention is depicted therein and is designated generally by the numeral 10. With particular reference to FIG. 1 the clutch assembly 10 is depicted as effecting a driving connection between three shafts identified by the numerals 11, 12 and 13. Any one of the said shafts 11, 12 or 13 may be the drive shaft, and the remaining two, or either, as desired, may be the driven shaft(s).

The shaft 11, which may be axially aligned with the clutch assembly 10, is depicted as being supported for rotation in a bearing 14. The shaft 12 may also be axially aligned with the clutch assembly 10, and the shaft 12 is similarly depicted as being supported for rotation in a bearing 15. A clutch assembly 10 may be installed according to the teachings of the present invention to effect a driving connection between two axially aligned shafts, such as 11 and 12.

In addition, or alternatively, it may be desired to connect two shafts that are not axially aligned. To accomplish that objective a toothed flange 16 may, for example, be presented from an appropriate element of the clutch assembly 10, as will be hereinafter more fully described, to engage a gear 18 that is secured to shaft 13 which is axially offset from the shafts 11 and/or 12. In such an arrangement it may be desired, or required, to engage the toothed flange 16 with an idler gear assembly 19 that is supported with sufficient rigidity to neutralize any transverse forces resulting from the interaction between the toothed flange 16 and the gear 18.

The above described structural environment, within which the clutch assembly 10 may be employed to effect a driving connection between two or more shafts, is presented merely to demonstrate the comprehensive applicability of a clutch assembly embodying the concepts of the present invention and is not intended to define any limitation to the utility of such a clutch assembly.

Referring now more particularly to FIGS. 2 and 3 of the attached drawings, the exemplary embodiment of the clutch assembly 10 depicted therein employs a cylindrical clutch element 20 that may be presented integrally from, or be attached to, the rotatable shaft 11. Similarly, the rotatable shaft 12 may be attached to the hub 21 of, or it may itself present, a sleeve-like clutch element 22. The sleeve-like clutch element 22 is disposed radially outwardly of, and in spaced, concentric relation to, the cylindrical clutch element 20. The toothed flange 16 extends radially outwardly from the sleeve-like clutch element 22.

A pair of helical first and second springs 23 and 24 are positioned within the annulus 25 defined by the radial spacing between the cylindrical and sleeve-like clutch elements 20 and 22, respectively. The helical spring 23 has opposite ends 26 and 27, and the helical spring 24 has opposite ends 29 and 30. One end of each spring may be designated as the energizing end, and the other end of each spring may be the trailing end. These terms will not always apply to the same end of either spring inasmuch as those terms are indicative of the function the particular end performs in a specific embodiment of the invention. Hence, which end of each helical spring within the clutch assembly 10 becomes the energizing end, and which the trailing end, will require knowing: which clutch element 20 or 22 is being engaged by each spring; the disposition of the springs, one with respect to the other; and, the direction in which the clutch elements are to rotate.

The first helical spring 23 is wrapped about the exterior surface 31 of the cylindrical clutch element 20 in frictional engagement therewith, at least when the clutch assembly 10 is at rest. The second helical spring 24 is disposed concentrically within the sleeve-like clutch element 22 and frictionally engages the interior surface 32 thereof.

In the situation where the clutch element 20 is connected to the drive shaft (represented as shaft 11), the hand of the first spring 23 is determined by the direction in which the cylindrical clutch element 20 is to rotate when a driving connection is to be established between that clutch element 20 and the first spring 23. If, for example, it is desired that the frictional engagement between the cylindrical clutch element 20 and the first spring 23 is to be enhanced (at least through the desired range of rotational velocities, as will hereinafter be more fully explained) in response to clockwise rotation of the clutch element 20, as viewed in FIG. 3, the first helical spring 23 will be left-handed, as depicted.

In order to be certain that the designation of the particular "hand" is not misconstrued, it will be understood that the hand is determined by reference to the helical wrap of the spring as it is oriented in a vertical direction. So oriented the hand will be that direction in which the individual windings of the springs are oriented as they spiral upwardly. By that convention spring 23 is clearly depicted in the drawings as being a left-handed spring. The free end 26 of the first spring 23 would thus point to the left, as the spring is viewed in the disposition heretofore discussed to determine the hand thereof, and the free end 26 of the spring 23 also seems to point to the direction toward which the exterior surface 31 of the cylindrical clutch element 20 appears to be moving. That orientation of the free end 26 is, perhaps, best seen from FIG. 2.

Continuing with a description of the installation depicted in FIGS. 1-3, wherein the cylindrical clutch element 20 is the drive element of the clutch assembly 10 and it is rotated clockwise as viewed in FIG. 3, the free end 26 of the helical spring 23 is the energizing end thereof. The other end 27 of spring 23 is the trailing end thereof.

The second spring 24 is of opposite hand to the first spring 23. According to the convention described above, therefore, the second spring 24 is a right-handed spring. The second spring 24 is disposed in longitudinal succession with respect to the first spring 23, and in the arrangement being presently described end 29 of spring 24 is the energizing end. The trailing end 27 of the first spring 23 is connected to the energizing end 29 of the second spring 24, as by the pin 33 depicted in FIGS. 2 and 3. The free end 30 of the second spring 24 is the trailing end thereof.

By making the second spring 24 of opposite hand to the first spring 23 that rotation of the cylindrical clutch element 20 which enhances the frictional engagement between the exterior surface 31 of the clutch element 20 and the first spring 23 will also enhance the frictional engagement of the second spring 24 with the interior surface 32 of the sleeve-like clutch element 22.

To understand the foregoing summation as to the enhancement of frictional engagement in response to rotation of the clutch assembly 10, one must first appreciate the driving connection effected, for example, by the frictional engagement between the cylindrical clutch element 20 and the first spring 23. As used herein, friction shall mean the force which opposes the movement of one body across another body. Friction, then, is the force which resists sliding movement of one physical body across another. This force acts tangentially with respect to the surface of those bodies which are in contacting engagement. Applying this general precept to the present invention, frictional opposition to the sliding of the first spring 23 over the exterior surface 31 of the cylindrical clutch element 20 is affected by two primary factors: (1) the nature of the engaging surfaces, and (2) the force pressing the engaging surfaces together.

The nature of the engaging surfaces, in this context, is expressed as the coefficient of friction between those surfaces. As such, the frictional opposition to the sliding of the first spring 23 across the exterior surface 31 of the cylindrical clutch element 20 is equal to the normal force pressing those two surfaces together multiplied by the coefficient of friction therebetween. The coefficient of friction reflects the roughness, or smoothness, of the engaging surfaces over their contact area and the presence or absence of lubrication between the engaging surfaces.

To provide a relatively consistent coefficient of friction it may, for example, be desired to employ springs 23 and 24 of rectilinear cross section, as depicted, rather than of circular cross section. Springs of circular cross section would make linear contact with the clutch elements, and as such, even modest variations across the engaging surfaces presented from the clutch elements could introduce an error in the reliability for the coefficient of friction one would otherwise expect between the engaging surfaces.

The force pressing the surfaces together must be directionally considered as the force normal to the engaging surfaces. This force is provided by the helical diameter to which the spring 23 was wrapped, in relation to the diameter of the cylindrical surface 31 upon which the spring 23 will be mounted, as well as the material from which the spring 23 is made, the cross sectional configuration and the area of the individual spring wraps, and the number of wraps with which the springs engage the clutch elements. These factors contribute largely to the degree to which the spring 23 grips the clutch element 20 when the clutch assembly 10 is at rest, and thus the magnitude of the force normal to the engaging surfaces.

If the frictional force between the spring 23 and the clutch element 20 exceeds the rotational driving force applied by the clutch element 20 against the spring 23, the spring 23 will wrap itself even more tightly about the exterior surface 31 of the clutch element 20, at least during a portion of the range of rotational velocities deemed acceptable for those elements, to enhance the frictional force which resists rotation of the cylindrical clutch element relative to the spring.

Rotation of the spring 23, with the cylindrical clutch element 20, is imparted to the second spring 24 by virtue of the connecting pin 33 which fastens the trailing end 27 of the first spring 23 to the energizing end 29 of the second spring 24. The rotational force transferred from the first spring 23 to the second spring 24 tends to expand the second spring 24 against the interior surface 32 of the sleeve-like clutch element 22. This increases the force applied radially outwardly against the interior surface 32 of the sleeve-like clutch element 22 by the second spring 24, and if the frictional force between the second spring 24 and the clutch element 22 exceeds the rotational force applied between the second spring 24 and the clutch element 22, the clutch element 22 will rotate with the second spring 24.

The operation of the clutch assembly 10 to this point relies on the fact that helical springs can be torque-loaded about the axis of their helical configuration. Such loading is closely akin to the torsional loading of a shaft, except that torsional loading in the direction of the hand to which the spring is wound tends to decrease the diameter of the helical spring, and torque loading in the opposite direction tends to expand the diameter of the helical spring. In either event, the torque loading about the axis of the helix acts as a bending moment on each incremental length of the wrap which forms the circumference of the helical spring. The incremental lengths of the spring are thus stressed in flexure, and the stresses in the spring can be so analyzed.

During rotation, in either direction, of a helical spring about its axis, as is the situation which exists when the spring is incorporated in a rotating clutch assembly 10, a force is exerted by the helical spring. That force acts in a radially outward direction and is commonly termed as being the centrifugal force.

It will be recalled that, in the case of spring 23, the spring itself applies a gripping force to the exterior surface 31 of the clutch element 20, and that gripping force acts perpendicularly to—i.e., in a direction normal to—the engaging surfaces between those two members. In the context of the radially outwardly directed centrifugal force applied by the spring as a result of its rotation, the gripping force constitutes the centripetal force applied in opposition to the centrifugal force.

Accordingly, as the rotational velocity of the clutch assembly 10 increases, the centrifugal force eventually acquires a sufficient magnitude that the centripetal, or gripping, force is no longer sufficient to apply the frictional force necessary to maintain the rotational velocity of the spring 23 equal to the rotational velocity of the clutch element 20. Both the centrifugal and the centripetal forces can be mathematically calculated. Accordingly, the resulting slippage effects an overrunning of the clutch element 20 engaged by the spring 23 in response to an angular velocity in excess of a predetermined angular velocity.

It should also be appreciated that, to the contrary, the centrifugal force applied by the spring 24 against the sleeve-like clutch element 22 is resisted by the hoop strength of the clutch element 22 such that the magnitude of the normal force between the clutch element 22 and the spring 24 increases with increased rotational velocity. For that reason the speed related overrunning ability of a clutch assembly 10 must be fully achieved by the interaction between the spring 23 and the clutch element 20.

As soon as the rotational velocity of the clutch assembly 10 drops below the predetermined value, the centripetal, or gripping, force applied by spring 23 will exceed the centrifugal force sufficiently for the frictional force between the spring 23 and the clutch element 20 to exceed the rotational driving force between those same two elements and permit a reinstatement of the driving connection permitted by the clutch assembly 10.

The same concepts heretofore explained with respect to the situation wherein the drive element of the clutch assembly 10 is the cylindrical clutch element 20 apply with equal facility to the situation wherein the drive element of the clutch assembly 10 is the sleeve-like clutch element 22, the driven element is the cylindrical clutch element 20 and the driving connection is to be effected by rotation in the opposite direction. In that situation the free end 30 of the second spring 24 becomes the energizing end of that spring, and end 29 becomes the trailing end. Hence as the sleeve-like element 22 begins to rotate, the energizing end 30 of spring 24 frictionally engages the clutch element 22, forcing the spring 24 to expand against the interior surface 32 of the sleeve-like clutch element 22 and thus to rotate with that clutch element. End 27 of the spring 23 is, in this operation, the energizing end, and end 26 of spring 23 is the trailing end.

The now trailing end 29 of the second spring 24 is connected to the energizing end 27 of the first spring 23 so that rotation of the spring 24 with the sleeve-like clutch element 22 applies a force to the energizing end 27 of spring 23, causing spring 23 to wrap about, or to grasp, the external surface 31 of the cylindrical clutch element 20 even more firmly, thus insuring that the cylindrical clutch element 20 will rotate in response to rotation of the sleeve-like clutch element 22.

Even in this situation, where the sleeve-like clutch element 22 is the drive element, increased rotational velocities cause the first spring 23, by virtue of the centrifugal force which rotation of the spring 23 generates, to release its grip on the cylindrical clutch element 20, thus effecting the desired overrun at velocities above the accepted value.

It should now be apparent that either the cylindrical clutch element 20 or the sleeve-like clutch element 22 can be the drive element, and that a clutch assembly 10 embodying the concepts of the present invention will transmit torque between the rotating members operatively connected to the clutch assembly, irrespective of which rotating member is the drive, or driven, member.

In the two examples heretofore described, should one desire to effect a driving connection in the situation where the clutch elements are to rotate in the opposite direction, it will merely be required that the two helical springs 23 and 24 each be replaced by helical springs of opposite hand. The operation of the clutch assembly 10 remains the same if the hands of the springs are reversed; only the rotational direction in which a driving connection is achieved will be reversed.

Figure 5:
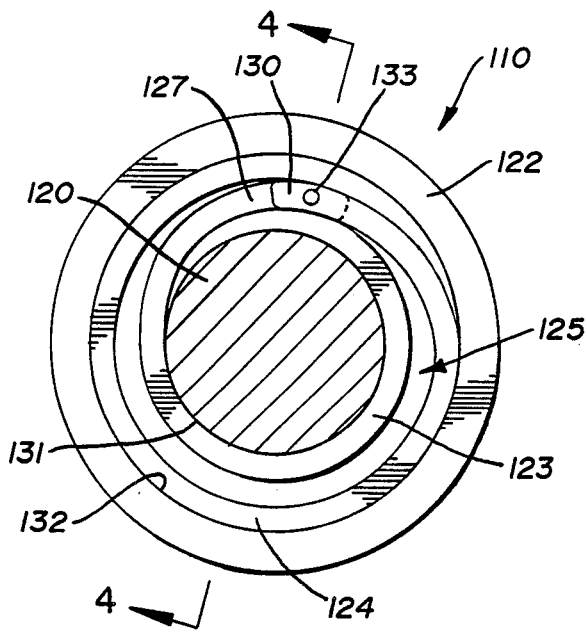
Figure 4:
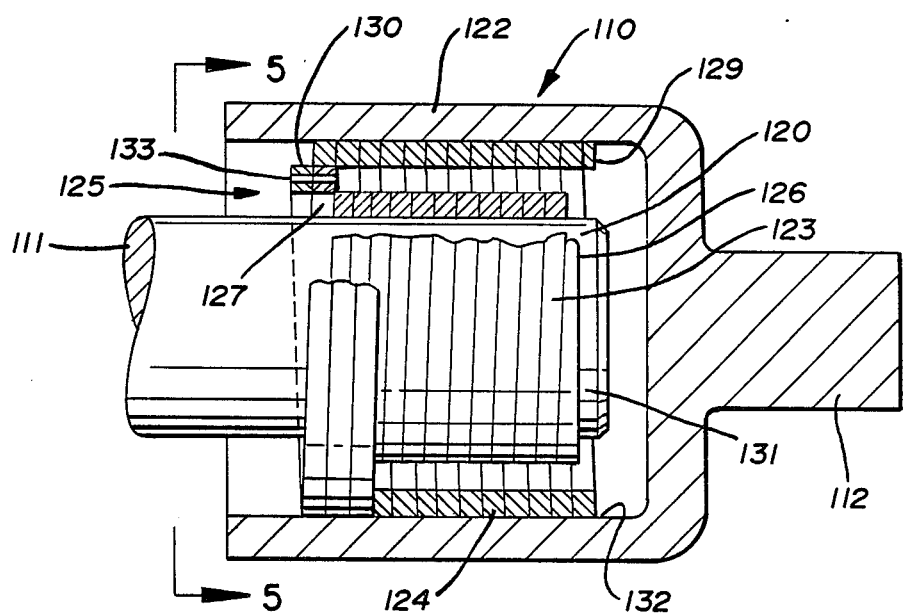
FIG. 4 is a view similar to FIG. 2 but depicting an alternative structural arrangement for a clutch assembly embodying the concepts of the present invention, the orientation of this view being disposed substantially along line 4—4 of FIG. 5; and, FIG. 5 is a transverse section taken substantially along line 5—5 of FIG. 4.

An alternative embodiment of a clutch assembly, which incorporates the concepts of the present invention and which is identified by the numeral 110, is depicted in FIGS. 4 and 5 as effecting a driving connection between two shafts 111 and 112, either of which may be the drive shaft with the other being the driven shaft.

The clutch assembly 110 employs a cylindrical clutch element 120 that may be presented integrally from, or be attached to, the rotatable shaft 111. Similarly, the rotatable shaft 112 may be attached to, or it may itself present, a sleeve-like clutch element 122. The sleeve-like clutch element 122 is disposed radially outwardly of the cylindrical clutch element 120 in spaced, concentric relation to the cylindrical clutch element 120.

A pair of helical first and second springs 123 and 124 are positioned within the annulus 125 defined by the radial spacing between the cylindrical and sleeve-like clutch elements 120 and 122, respectively. The helical spring 123 has opposite ends 126 and 127, and the helical spring 124 has opposite ends 129 and 130. One end of each spring will be the energizing end, and the other end of each spring will be the trailing end. As explained in detail with respect to the embodiment depicted in FIGS. 1–3, these terms will not always apply to the same end of either spring inasmuch as those terms are generally indicative of the function the particular end performs.

The first helical spring 123 is wrapped about the exterior surface 131 of the cylindrical clutch element 120 in frictional engagement therewith, at least when the clutch assembly 110 is at rest. The second helical spring 124 is disposed concentrically within the sleeve-like clutch element 122 and frictionally engages the interior surface 132 thereof. In addition, it will be noted that the second spring 124 is located concentrically outwardly of the first spring 123 rather than being disposed in longitudinal succession with respect thereto. Such an arrangement is particularly desirable for installations where a dimensional restriction is imposed on the axial length of the clutch assembly.

Assuming that shaft 111 is the drive member, the hand of the first spring 123 is determined by the direction in which the cylindrical clutch element 120 is to rotate when a driving connection is to be established between that clutch element 120 and the first spring 123. This determination is made in the same manner as explained in conjunction with the embodiment depicted in FIGS. 1-3. Accordingly, this description will proceed on the basis that the cylindrical clutch element 120 is rotating in a direction such that the first helical spring 123 will be left-handed, as depicted in FIG. 4. On that basis the shaft 111, and thus the cylindrical clutch element 120, will rotate counterclockwise as viewed in FIG. 5.

In that embodiment of the clutch assembly identified by the numeral 110, and depicted in FIGS. 4 and 5, the hand of the second spring 124 will, contrary to the embodiment depicted in FIGS. 1 through 3, be of the same hand as the first spring 123. As depicted in FIG. 4, therefore, both springs 123 and 124 are left-handed. When the springs are of the same hand, the second spring 124 must be disposed in spaced, concentric relation about the first spring 123 and also concentrically within the sleeve-like clutch element 122. The now energizing end 130 of the second spring 124 is disposed in substantially radial alignment with the trailing end 127 of the first spring 123, but is sufficiently offset, in a longitudinal direction, that those two ends can be secured by a connecting pin 133.

As explained in considerable detail in conjunction with the embodiment of the clutch assembly 10 depicted on FIGS. 1-3, and as equally applicable to the embodiment depicted in FIGS. 4 and 5, when the frictional force between the spring 123 and the clutch element 120 exceeds the rotational driving force applied by the clutch element 120 against the spring 123, that spring will not only rotate with the clutch element 120, but because the energizing end 126 of spring 123 is free, the spring 123 will wrap itself even more tightly about the exterior surface 131 of the clutch element 120, at least during the lower range of rotational velocities desired for those elements.

Rotation of the spring 123, with the cylindrical clutch element 120, is imparted to the second spring 124 by virtue of the connecting pin 133 which fastens the trailing end 127 of the first spring 123 to the energizing end 130 of the second spring 124. The rotational force thus transferred from the first spring 123 to the second spring 124 tends to expand the second spring 124 against the interior surface 132 of the sleeve-like clutch element 122. This enhances the radially oriented, or normal, force acting between the second spring 124 and the interior surface 132 of the clutch element 122 engaged by the spring 124, and so long as the frictional force between the second spring 124 and the sleeve-like clutch element 122 exceeds the rotational force applied between the second spring 124 and the clutch element 122, the clutch element 122 will rotate in response to rotation of the cylindrical clutch element 120.

As the rotational velocity of the clutch assembly 110 increases, the centrifugal force acquires a sufficient magnitude that the centripetal, or gripping, force is no longer sufficient to apply the frictional force necessary to maintain the rotational velocity of the spring 123 equal to the rotational velocity of the clutch element 120. The resulting slippage effects an overrunning of the clutch element 120 engaged by the spring 123 in response to an angular velocity in excess of a predetermined angular velocity.

It should also be appreciated that, to the contrary, the centrifugal force applied by the spring 124 against the sleeve-like clutch element 122 is resisted by the hoop strength of the clutch element 122 such that the magnitude of the normal force between the clutch element 122 and the spring 124 continues to increase with increased rotational velocity. For that reason the speed related overrunning ability of a clutch assembly 110 must be fully achieved by the interaction between the spring 123 and the clutch element 120.

As soon as the rotational velocity of the clutch assembly 110 drops below the predetermined value, the centripetal force applied by spring 123 will exceed the centrifugal force sufficiently for the frictional force between the spring 123 and the clutch element 120 to exceed the rotational driving force between those same two elements and permit a reinstatement of the driving connection effected by the clutch assembly 110.

Reverse rotation may be effected with the embodiment depicted in FIGS. 4 and 5 by employing two right-handed springs in lieu of the two left-handed springs 123 and 124; otherwise, the operation of clutch assembly 110 remains exactly the same as described above.

It should also be appreciated that the sleeve-like clutch element 122 may serve as the drive element with equal facility as the cylindrical clutch element 120. In that situation the free end 129 of the spring 124 becomes the energizing end, and end 130 becomes the trailing end thereof. Similarly, end 127 of spring 123 becomes the energizing end thereof, and end 126 of spring 123 becomes the trailing end.

Accordingly, as the sleeve-like clutch element 122 begins to rotate, the energizing end 129 of spring 124 frictionally engages the interior surface 132 of clutch element 122, forcing the spring 124 to expand thereagainst and thus to rotate with that clutch element.

The trailing end 130 of the second spring 124 is connected to the now energizing end 127 of the first spring 123 so that rotation of the spring 124 with the sleeve-like clutch element 122 applies a force to the energizing end 127 of spring 123, causing spring 123 to grasp the cylindrical clutch element 120 even more firmly, thus insuring that the cylindrical clutch element 120 will rotate in response to rotation of the sleeve-like clutch element 122.

Even in this situation, where the sleeve-like clutch element 122 is the drive element, increased rotational velocities cause the first spring 123, by virtue of the centrifugal force which rotation of the spring 123 generates, to release its grip on the cylindrical clutch element 120, thus effecting the desired overrun at velocities above the accepted value.

As with the previously described configurations, reverse rotation can be achieved merely by substituting springs of opposite hand for the springs 123 and 124, with the operation of the clutch assembly 110 otherwise remaining the same.

Either embodiment of the clutch assembly 10 or 110 effects a self bearing action between the two clutch elements. That is, the springs 23 and 24 or 123 and 124 in the two embodiments serve to center the cylindrical clutch element 20 or 120 with respect to the sleeve-like clutch element 22 or 122 without the need for an outside bearing being located in close proximity to the clutch itself. It should also be appreciated that the presence of the spring between the shafts connected thereby thus effects a positive advantage whereas the presence of the spring between the shafts in the prior known arrangements had a deleterious affect. Note that the free ends must not be used for centering.

Accordingly, a clutch assembly embodying the concepts of the present invention allows either clutch element to serve as the drive or driven element and otherwise accomplishes the objects of the invention.

The embodiments of the invention in which an exclusive property or privilege is claimed are defined as follows:

1. A clutch to interconnect drive and driven rotating members, said clutch comprising: a cylindrical clutch element operatively connected to one of the rotating members; a sleeve-like clutch element operatively connected to at least one other of the rotating members; said sleeve-like clutch element disposed radially outwardly of said cylindrical clutch element in spaced, concentric relation with respect thereto; first and second helical spring means each having opposed energizing and trailing ends; said first spring means disposed concentrically about said cylindrical clutch element and frictionally engaging the same when clutch is at rest; the hand of said first spring means being selected to enhance the frictional engagement of said spring means with said cylindrical clutch element in response to rotation thereof in one direction, and conversely, to decrease the frictional engagement in response to counter-rotation thereof; said second spring means disposed in spaced, concentric relation about said first spring means and also concentrically within said sleeve-like element frictionally to engage the sleeve-like clutch element; said second spring means being of the same hand as said first spring means; the energizing end of the spring means which frictionally engages that clutch element secured to the driven member being disposed in substantially radial alignment with, and being secured to, the trailing end of the first spring means which frictionally engages that clutch element secured to the drive member; and, at least one said spring means being selected to effect overrunning of the rotating clutch element engaged thereby in response to an angular velocity in excess of a preselected angular velocity.

* * * * *